United States Patent
Laitkorpi et al.

(10) Patent No.: US 9,417,796 B2
(45) Date of Patent: Aug. 16, 2016

(54) METHOD, A SERVER, A SYSTEM AND A COMPUTER PROGRAM PRODUCT FOR COPYING DATA FROM A SOURCE SERVER TO A TARGET SERVER

(75) Inventors: Markku Laitkorpi, Tampere (FI); Antti Nivala, Pirkkala (FI); Juho Nokela, Tampere (FI); Timo Partanen, Lempäälä (FI); Juha Lepola, Tampere (FO)

(73) Assignee: M-Files Oy, Tampere (FI)

( * ) Notice: Subject to any disclaimer, the term of this patent is extended or adjusted under 35 U.S.C. 154(b) by 139 days.

(21) Appl. No.: 13/537,720

(22) Filed: Jun. 29, 2012

(65) Prior Publication Data
US 2014/0006345 A1 Jan. 2, 2014

(51) Int. Cl.
*G06F 17/30* (2006.01)
*G06F 3/06* (2006.01)
*H04L 29/08* (2006.01)

(52) U.S. Cl.
CPC .............. *G06F 3/061* (2013.01); *G06F 3/067* (2013.01); *G06F 3/0647* (2013.01); *H04L 67/1095* (2013.01)

(58) Field of Classification Search
CPC .............................................. G06F 17/30914
USPC ......... 707/609, 607, 610, 640, 687, 705, 790, 707/813
See application file for complete search history.

(56) References Cited

U.S. PATENT DOCUMENTS

| | | | |
|---|---|---|---|
| 2003/0110176 A1 | 6/2003 | Morgan et al. | |
| 2007/0078885 A1 | 4/2007 | Klein, Jr. | |
| 2007/0233828 A1* | 10/2007 | Gilbert | G06F 11/1458 709/223 |
| 2008/0034015 A1 | 2/2008 | Behnen et al. | |
| 2008/0162530 A1* | 7/2008 | van Eikeren | G06F 17/212 |
| 2009/0222498 A1* | 9/2009 | Lu | G06F 17/30067 |
| 2012/0030247 A1 | 2/2012 | Yambal et al. | |
| 2013/0054524 A1 | 2/2013 | Anglin et al. | |

OTHER PUBLICATIONS computing cloud.*
E. Rahm, et al.; "A survey of approaches to automatic schema matching;" VLDB Journal, Springer Verlag, Berlin, Germany; vol. 10; Nov. 21, 2001; pp. 334-350.

* cited by examiner

*Primary Examiner* — Sana Al Hashemi
(74) *Attorney, Agent, or Firm* — Ware, Fressola, Maguire & Barber LLP (57) ABSTRACT

The invention relates to a method for copying data from a source server to a target server, wherein the data is associated with a metadata. The method comprises mapping the metadata of the data to the metadata structure of the target server, where the mapping comprises determining common names for properties being comprised in the metadata; determining if the determined common names exist in the metadata structure of the target server; and if so, copying—together with the data—such properties of the metadata that have matching common names in the metadata structure of the target server. The invention also relates to a hybrid content management system.

26 Claims, 5 Drawing Sheets

| | 201 |
|---|---|
| Name: *letter.doc* | FILENAME |
| Creator: *John Welsh* | GENERATOR |
| Created: *2012-05-01* | GENERATED |
| Category: *projects* | GROUP |
| Type: *offer* | TYPE |
| Sent: *2012-05-08* | MAILED |
| Client: *TheFirm LTD* | CLIENT |
| Client number: *1209324* | CLIENT NUMBER |
| Last modified: *Ella May* | LAST UPDATED |

210

| | 211 |
|---|---|
| Title: | FILENAME |
| Author: | GENERATOR |
| Created: | GENERATED |
| Class: | GROUP |
| Sent: | MAILED |
| Client: | CLIENT |
| Client number: | CLIENT NUMBER |
| Last modified: | LAST UPDATED |

METHOD, A SERVER, A SYSTEM AND A COMPUTER PROGRAM PRODUCT FOR COPYING DATA FROM A SOURCE SERVER TO A TARGET SERVER

FIELD OF THE INVENTION

The present invention relates to data transfer between servers. In particular, the present invention relates to an adaptation of metadata structure between the servers. Yet further, the invention relates to a content management system.

BACKGROUND OF THE INVENTION

Enterprise Content Management (ECM) system refers to a system organizing and storing organization's electronic documents and other business-related objects and/or content. ECM system may comprise content management systems (CMS), document management systems (DMS) and data management systems. Such systems comprise various features for managing electronic documents, e.g. storing, versioning, indexing, searching for and retrieval of documents. It is appreciated that there are both dynamic and static content management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The location of the files is not constant, but may vary in a virtual space depending on the situation.

The content management system may be distributed in such a manner that it comprises several servers or storages for different purposes.

SUMMARY OF THE INVENTION

Now there has been invented an improved method and technical equipment implementing the method, to alleviate problems that might occur when data is transmitted between different servers, and when documents are accessed and processed via one of the servers.

Various aspects of the invention include a method, a server, a system, a computer program product and a content management system, which are characterized by what is stated in the independent claims. Various embodiments of the invention are disclosed in the dependent claims.

According to a first aspect, a method for copying data being associated with a metadata from a source server to a target server comprises mapping the metadata of the data to the metadata structure of the target server; where the mapping comprises determining common names for properties being comprised in the metadata; determining if the determined common names exist in the metadata structure of the target server; and if so, copying—together with the data—such properties of the metadata that have matching common names in the metadata structure of the target server.

According to a second aspect, a server comprises a processor, memory including computer program code, the memory and the computer program code configured to, with the processor, cause the server to perform at least the following: copying data from the server to a target server, wherein said data is associated with a metadata; mapping the metadata of the data to the metadata structure of the target server, where the mapping comprises determining common names for properties being comprised in the metadata; determining if the determined common names exist in the metadata structure of the target server; and if so, copying—together with the data—such properties of the metadata that have matching common names in the metadata structure of the target server.

According to a third aspect a system comprises at least a source server comprising a processor, memory including computer program code, and a target server comprising a processor, memory including computer program code, wherein the cooperation of the source server and the target server causes the system to perform at least the following: copying data from the source server to a target server, wherein said data is associated with a metadata; mapping the metadata of the data to the metadata structure of the target server, where the mapping comprises determining common names for properties being comprised in the metadata; determining if the determined common names exist in the metadata structure of the target server; and if so, copying—together with the data—such properties of the metadata that have matching common names in the metadata structure of the target server.

According to a fourth aspect, a computer program product comprises a computer-readable medium bearing computer program code embodied therein for use with a computer, the computer program code comprising: code for mapping the metadata of the data to the metadata structure of the target server; code for determining common names for properties being comprised in the metadata; code for determining if the determined common names exist in the metadata structure of the target server; and if so, code for copying—together with the data—such properties of the metadata that have matching common names in the metadata structure of the target server.

According to a fifth aspect, a content management system, comprises at least one main server and at least one local main server, wherein said main server is configured to store electronic objects and said local main server is configured to store at least part of the electronic objects of the main server, wherein said servers are accessible by at least one client device, wherein said main server is a cloud-based server, and said local server is an on-premise server.

According to an embodiment, a metadata structure template relating to the metadata structure of the target server is obtained and the metadata is mapped to such a template.

According to an embodiment, it is determined whether the metadata structure of the target server comprises corresponding names as the properties in the metadata.

According to an embodiment, the properties of the metadata is mapped to the corresponding names in the metadata structure of the target server.

According to an embodiment, the copying of the metadata is controlled by determining which of the transferable properties are allowed to be copied.

According to an embodiment, the common name is a string of letters or numbers.

According to an embodiment, the copied data is queried from the source server and the target server by means of the common names.

According to an embodiment, one of the servers is a cloud-based server.

According to an embodiment, the property is a feature of an electronic object that is expressed as a name-value pair.

According to an embodiment, the mapping of the properties is performed for each property name, and additionally for each property value of certain properties with predefined semantics such as an object class, workflow, a workflow state, a permission.

According to an embodiment, one of the servers is an on-premise server, wherein the other of the servers is a cloud server.

DESCRIPTION OF THE DRAWINGS

In the following, various embodiments of the invention will be described in more detail with reference to the appended drawings, in which.

DETAILED DESCRIPTION OF THE EMBODIMENTS

In the following, several embodiments of the invention will be described in the context of content management system. It is to be noted, however, that the invention is not limited to content management. In fact, the different embodiments may have applications widely in any environment where data transmission is required.

Figure 1:
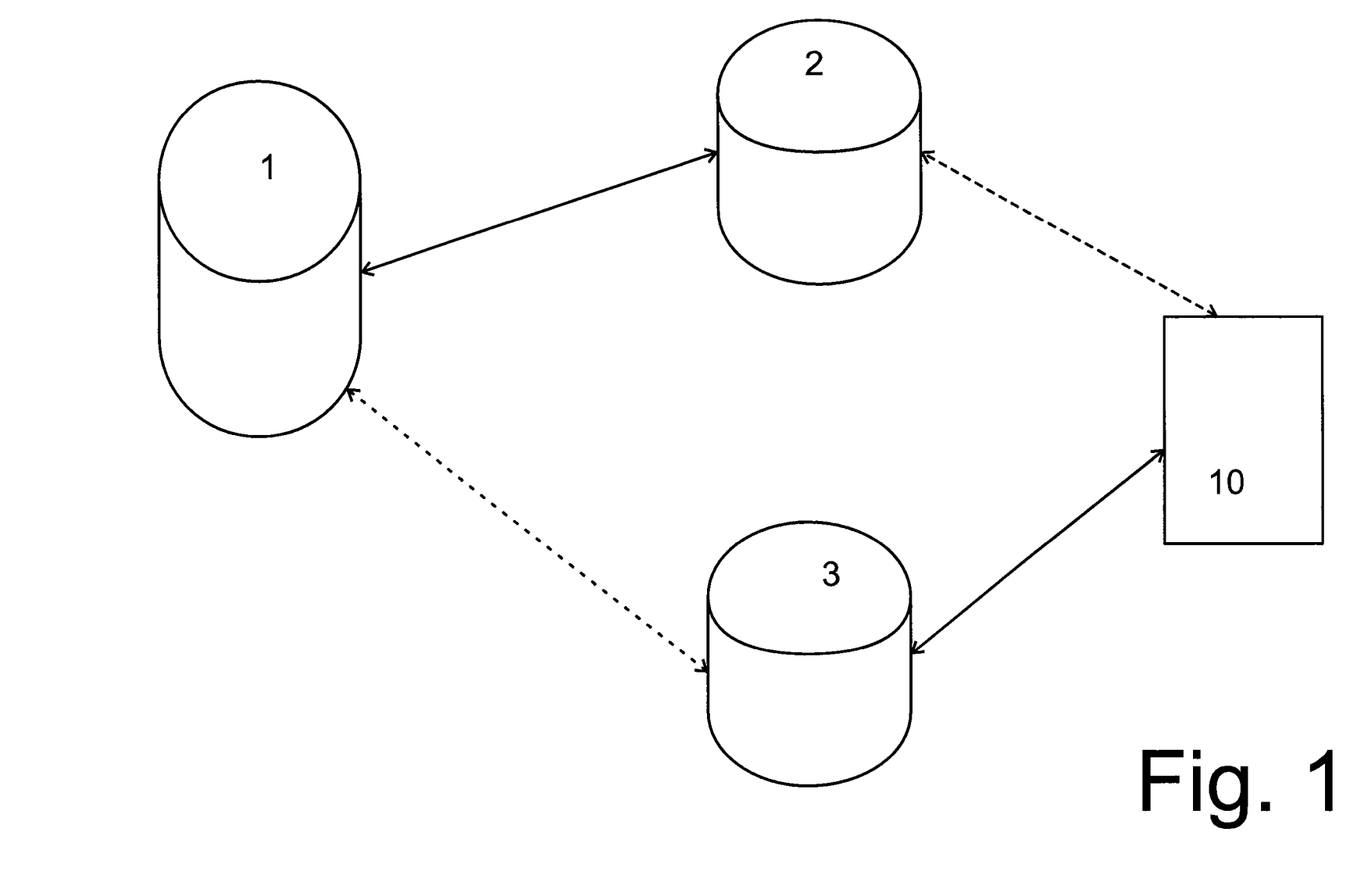
FIG. 1 shows an example of a system in a simplified manner.

The present embodiments relate to a system, such as a content management system, the example of which is shown in FIG. 1. Such a system may comprise a main server 1, at least one caching replica server 2 and at least one local main server 3. According to an embodiment, the servers are so called on-premise servers. According to another embodiment, the main server 1 is a cloud-based server, whereby the caching replica server 2 and the local main server 3 are on-premise servers. Such a content management system is here called a hybrid content management system.

"On-premise" means that the document management server(s) are located behind the organization's network firewall, where they are generally not accessible by the public. Instead, such "on-premise" server(s) are generally accessible only by users within the firewall-protected local area network, or by connecting to the organization's virtual private network with appropriate tools, requiring organization-specific authentication. The "on-premise" server(s) are typically physically located in buildings owned or leased by the organization, or in a private data center controlled and maintained by a contractor of the organization. As opposed to an "on-premise" document management system, a "cloud-based" document management system has its server(s) located outside the organization's firewall.

The caching replica server 2 and the local main server 3 may reside in a remote unit of the content management system. There can be more than one remote units in the content management system, and each remote unit have at least one caching replica server and/or at least one local main server. The number of servers may vary according to the situation. For example, for one remote unit, there can be as many local main server as there are caching replica server, or there can be different amount of local main servers and caching replica servers.

The main server 1 can comprise various features for managing electronic documents, e.g. storing, versioning, indexing, searching for and retrieval of documents. The main server 1 can be a dynamic system, where stored files comprise identifications that define their existence in the storage. "File" in this disclosure relates to a medium that has been created by a certain application. For example, a piece of text created by using the Microsoft Word application and saved on the "C:\" drive is a file. Similarly, a drawing created by using the AutoCAD application represents a file. The file can be associated with metadata, whereby the file becomes a "document". Instead of term "document" also term "electronic object" can be used. "Metadata" refers to information on a document's properties. For example, a creator of the file or a creation date may represent content of the metadata. In addition to the metadata, the document may also comprise version history and reference information to other documents.

The main server 1 may store documents together with the metadata, version history as well as reference information. In an embodiment, the caching replica server 2 is a replica of the main server 1, being configured to store the documents' file data only, and not documents' metadata, version history and reference information. The caching replica server 2 can be used by a client 10 to access the files instead of the main server 1. The caching replica server 2 may have a live connection to the main server 1, whereby if e.g. metadata is needed, that can be obtained from the main server 1. Such a use of a caching replica server 2 saves the bandwidth, because not all the data in the main server 1 needs to be copied to the caching replica server 2.

A local main server 3 may be parallel to caching replica server 2. They can be located in a same physical device or can be separated. However, the local main server 3 is a copy of the main server 1 with respect to such data that is relevant to the user. In a situation, where the main server 1 is a cloud service, the main server 1 can be a warm copy (takes the synchronization delay into account) of the local main server 3. The main server 1 can be used, if local main server 3 is temporarily down. The local main server 3 can also be a relevant subset of main server 1, whereby the local main server 3 provides locally optimized user experience while the overall cloud environment ensures the high availability of the full data via caching replica server.

The data that can be synchronized between the local main server and the main server comprises not only the document files, but also metadata, version history and references, or at least some of them, whereby it provides a better availability of data to the client than the caching replica server. The local main server 3 also may comprise various features for managing electronic documents, e.g. storing, versioning, indexing, searching for and retrieval of documents. The local main server 3 does not need to have a constant on-line connection to the main server 1. The connection can be formed when data is synchronized between the main server 1 and the local main server 3.

The client 10 may use the local main server 3 actively, and the caching replica server 2 only when needed. The client 10 may be configured to use both of the servers 2, 3, but the local main server 3 can be prioritized because it comprises the most important and complete data, which the client needs constantly. The caching replica server 2 may comprise data that is needed less frequently, e.g. archived data and other read-only data.

Typically, the main server 1 needs not to be used, because the local main server 3 comprises all the locally relevant data of the main server 1. In addition, the main server 1 may be located farthest away from the client 10, which on one hand means that the physical distance between the client 10 and the main server 1 is long or they situate in different networks, but on the other hand relates to the accessibility from the client 10 to the main server 1. In order to access the data in the main server 1, the client 10 may need to solve the availability of the main server network and problems that might be caused by slow data transfer. The local main server 3 may be located closest to the client, either physically but also in terms of data accessibility. Therefore, the local main server 3 optimizes network usage and data availability, because all the locally relevant data is available and no attention needs to be paid to network accessibility and possible network problems.

When a document is created in one of the aforementioned servers, the document is assigned a global/universal unique identification. The identification comprises an identification of the home server (i.e. the server where the document was created) and an individual identification of the document in the home server. As a result of this, the object has a global/universal unique identification that differentiates the object throughout the system, but also a local identification that differentiates the object in a certain server.

At the time the local main server 3 is established the data from the main server 1 is copied (i.e. synchronized) to the local main server 3. After that, the data can be synchronized between the local main server 3 and the main server 1 always when needed. Because the connection between the main server 1 and the local main server 3 is not necessarily constantly on, the synchronization may be performed in certain periods. This means that updateable data is gathered for a certain time, and all the data that has been gathered until then are transmitted simultaneously.

When an document is copied to the other server (e.g. from the main server 1 to the local main server 3), it is determined whether the target server (i.e. local main server 3 in this example) already comprises the object. That can be determined by checking whether the target server comprises any object having the same global/universal unique identification. If the target server already comprises the object, any changes relating to the object are transmitted to the target server. If the object is not in the target server, a new object corresponding the transmitted object is created in the target server, with the original unique identification and local identification, which local identification relates to the target server.

As discussed, in addition to the document file, also other data relating to the document can be transmitted (i.e. copied/synchronized) between the main server 1 and the local main server 2. Such data may include also the metadata structure and/or version history and/or references. As said, "metadata" refers to information on a document's properties. For example, a creator of the file or a creation date may represent content of the metadata. Metadata is composed of two parts—a definition part and a content part. The definition part defines generally the type of property; client, project, customer, creator, date, etc. The content part on the other hand specifies the value of the metadata, i.e. which client ("BeefEaters Ltd"), which project ("BBQ party"), which customer ("Edvin Tournedous"), which creator ("John Leaderman"), which date ("20120501"). For further example, specified values for a creator of the file or a creation date represent content of the metadata. In addition, a project which the document belongs to; a client who owns the document; a type of the document (letter, assignment, publication, order etc.); name of the document are examples of the content of metadata. Despite the plural form of metadata, in this disclosure, the term metadata may also refer to a singular form. Therefore, an object being defined by "metadata" may in practice be defined by one or more pieces of metadata. In the present disclosure, term "property—properties" is used as a synonym for metadata.

The metadata structure is a selection of properties for a specific server. These properties are selected and named for server's purposes, for example, according to the business area, according to the information required for running the business, according to the workflow, according to the correspondents, according to the personnel etc. This selection of properties are used for each document in the server in question either completely or selectively.

Figure 2:
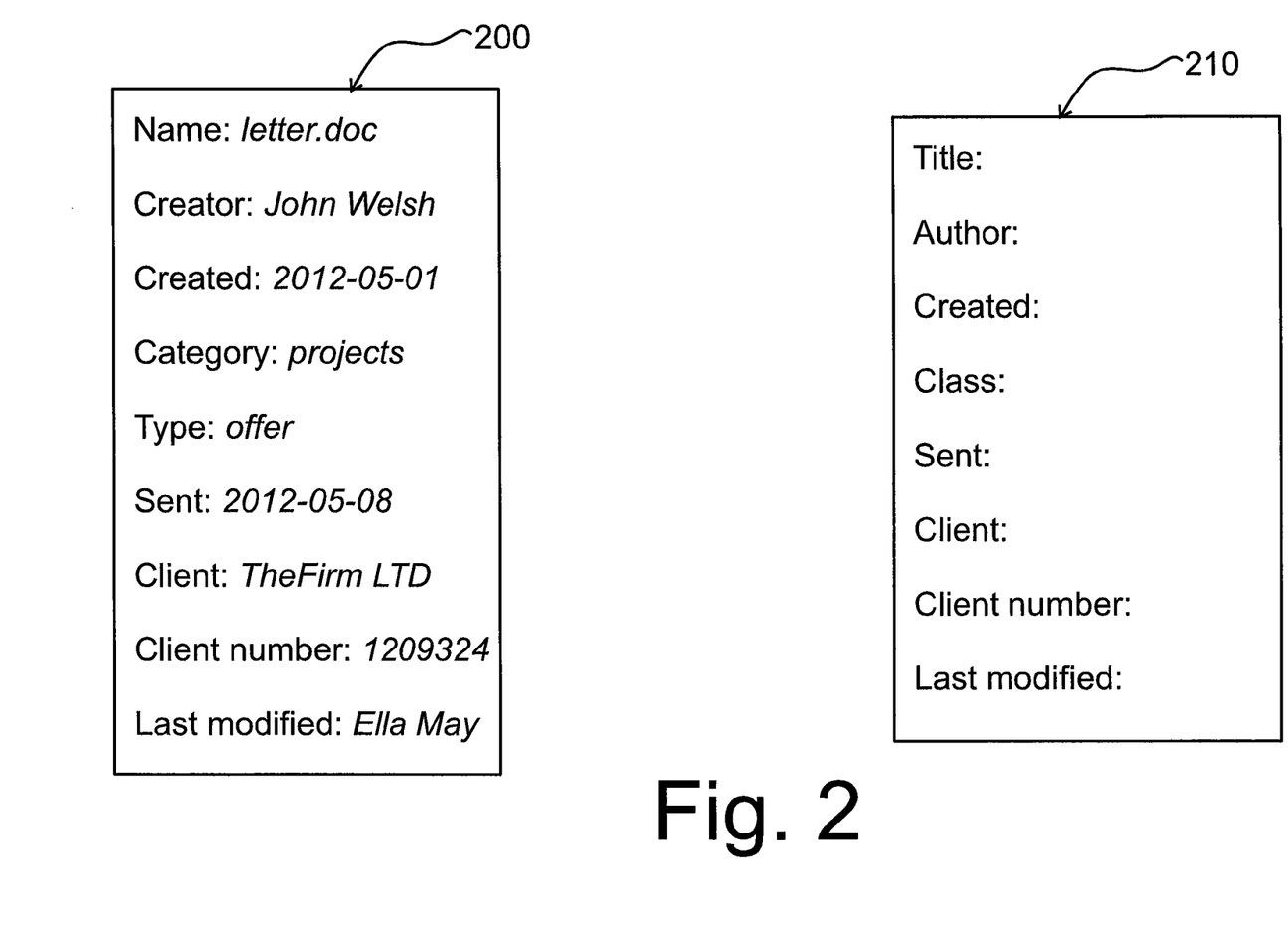
FIG. 2 shows two examples of metadata structures.

FIG. 2 illustrates an example of a metadata structure 200 for a main server 1, and an example of a metadata structure 210 for a local main server 3. The metadata structure 200 comprises properties "Name", "Creator", "Created", "Category", "Type", "Sent", "Client", "Client number" and "Last modified" having values for a certain document "letter.doc", "John Welsh", "2012-05-01" "projects", "offer", "2012-05-08", "The Firm LTD", "1209324" and "Ella May", respectively. The metadata structure 210 comprises properties "Title", "Author", "Created", "Class", "Sent", "Client", "Client number" and "Last modified".

It is realized that in the example of FIG. 2, the metadata structures 200, 210 are different. It is possible, that either all the property types are different, or the names of the property types are different even though they relate to same property.

When the metadata structures in the main server 1 and the local main server 2 are the same, the documents may be transmitted directly between the servers. However, when the metadata structures deviate from each other (as in FIG. 2), a selection how the metadata is synchronized between the servers needs to be made, when a document is copied to another server.

One embodiment is to perform metadata synchronization between servers is to use common names (i.e. aliases). Alias is a common name or identification for a property defining a similar content. For example alias "creating person" can be an alias for properties "an originator", "a creator", "an author". In addition, the alias can be a common numerical value being assigned for similar types of properties. At the time the metadata structure having a property for "a creator" is transmitted to a target server, it is checked whether "a creator" has an alias. If so, the alias, e.g. "creating person" is looked for in the target server. Depending on the property name the target server uses, the metadata structure being transmitted is synchronized accordingly. The target server may have a property "author" that has an alias "creating person". Therefore, if the target server uses "author" as a property name, the metadata structure being transmitted is synchronized to have a property "author" instead of "creator".

If an alias is not found for a certain property, the system may be configured to use the property name as an alias, and to perform the mapping based on these property names. This means that any property (piece of metadata) of a document that has a corresponding property (having a same name) in the target server is transmitted to the target server.

If a property of a document does not have a corresponding property (matching property names or aliases) in the target server, such a property can be ignored and left out from transmission. This is possible, because it is assumed that the most important properties (e.g. a creator, a date, etc.) have correspondences in the target server.

Figure 3:
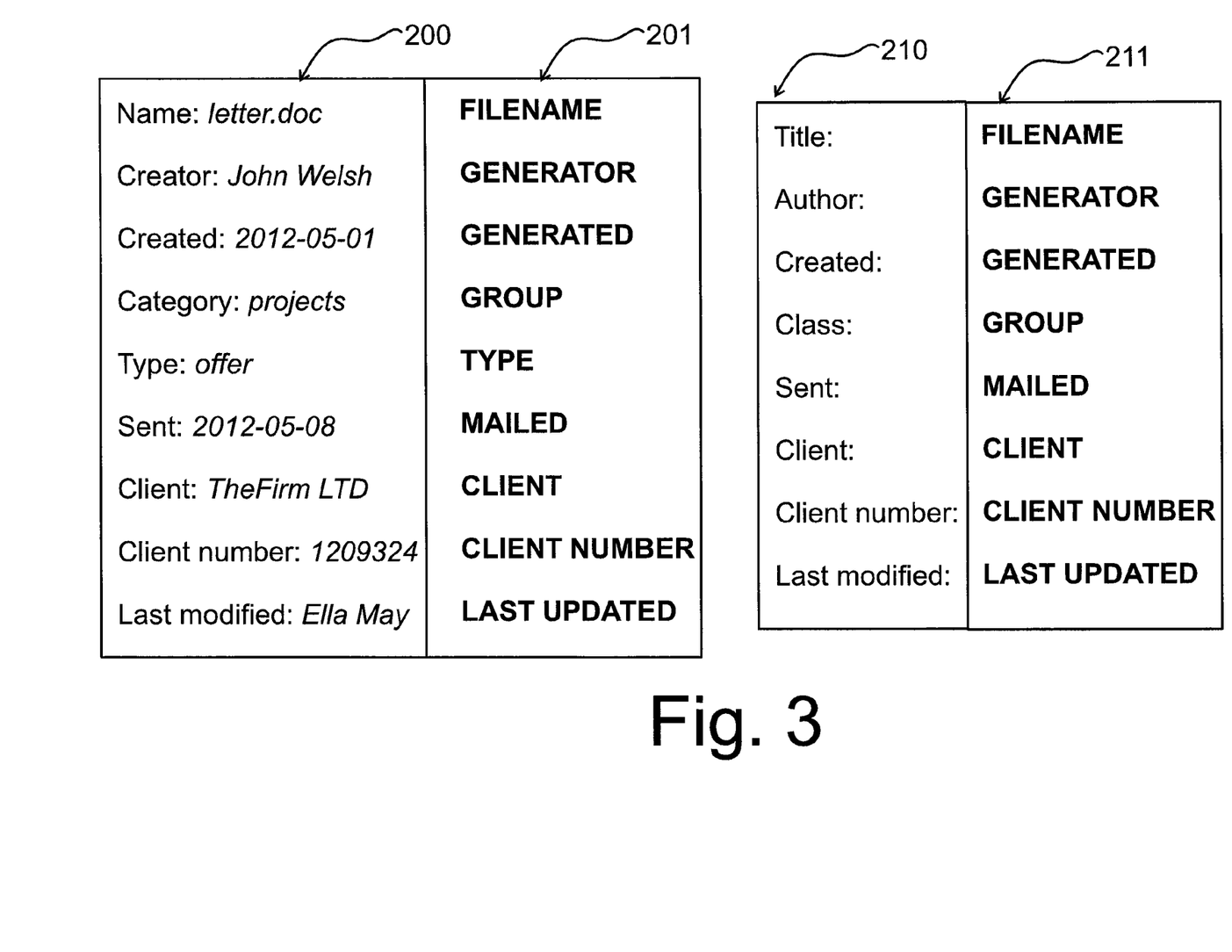
FIG. 3 shows the metadata structure of FIG. 2 with common names.

In the example shown in FIG. 2, the alias-based synchronization can be performed as shown in FIG. 3. FIG. 3 shows the metadata structure 200 with properties and their corresponding aliases 201 listed. Property "Name" has alias "Filename", property "Creator" has an alias "Generator", property "Created" has an alias "Generated", property "Category" has an alias "Group", property "Type" has an alias "Type", property "Sent" has an alias "Mailed", property "Client" has an alias "Client", property "Client number" has an alias "Client number", property "Last modified" has an alias "Last updated". It is appreciated that in this example, the alias names have been selected to be descriptive names for understanding purposes. However, any string of letters and/or numbers can be used as an alias as long as it has a common meaning for different servers' metadata structure. Such terms can be found e.g. from general concepts such as Dublin Core, where "dc:publisher" could be used as an alias for property "publisher" of main server 1 and for property "producer" of local main server 3.

In a similar manner, the metadata structure 210 has aliases 211 listed. Property "Title" has alias "Filename", property "Author" has an alias "Generator", property "Created" has an alias "Generated", property "Class" has an alias "Group", property "Sent" has an alias "Mailed", property "Client" has an alias "Client", property "Client number" has an alias "Client number", property "Last modified" has an alias "Last updated".

It is realized that alias-based mapping can be performed for properties "name", "creator", "created", "category", "sent", "client", "client number" and "last modified" of the metadata structure 200 to metadata structure 210, because those properties have common names having match in the target metadata structure.

In another embodiment, properties such as "Created", "Sent", "Client", "Client number" and "Last modified" could also be directly mapped to the metadata structure 210 of the other server based on property names only, because both metadata structure comprises same property names.

In the example of FIG. 3, common names between two metadata structures have been presented. However, it is possible that a property may have several aliases to allow mapping between several different types of metadata structures. This means that a property "name" in a metadata structure may have an alias "creator" for a first metadata structure and also an alias "owner" for a second metadata structure. However, this may cause conflict if, at the time the metadata is mapped to the first metadata structure, the first metadata structure comprises properties "creating person" having alias "creator" and "owning person" having an alias "owner". Therefore a property "name" having aliases "creator" and "owner" could be mapped to any of them. In order to solve this, the mapping may be carried out according to a priority list or the mapping of such property can be rejected.

By using the common names, i.e. aliases, the mapping of properties is enabled. It is realized from FIG. 3 that property "Type" of metadata structure 200 is not included in the metadata structure 210 in any form. Therefore, property "Type" is left out, when the document comprising the metadata structure 200 is copied to a server supporting the metadata structure 210.

According to FIG. 3, the alias listing can be presented together with the metadata structure. However, this may not be the case in practice. The alias listing may be stored as a table in at least one of the servers. Optionally, the aliases may be appointed to each property individually, as a part of the property definition.

The metadata structure can be transferred between servers by means of a metadata structure template provided e.g. by the target server. The template can be utilized to adapt the metadata structure of the source server according to format of the metadata structure of the target server. The template can include all the properties that are supported by the target server, whereby the mapping of properties can be done before the metadata structure is actually transmitted to the target server. The template can be formed of alias names which correspond the properties in the target server. For example, taking FIG. 3 as an example, the template may include alias listing as referred by 211. The metadata structure being transmitted with the document is mapped to that listing 211, and the new metadata structure for the document comprises all the matching properties of the template.

The present embodiment for using aliases together with the metadata structure also makes it possible to perform a metadata driven search from multiple servers at the same time, and to show the results in one window. For example, user may perform a query that is directed to servers that are included in the system and having a certain metadata structure for documents being stored. The metadata driven search means that when a user wishes to search for "client=Company X", the system is configured to perform the search by means of aliases of "client" in addition or instead to the direct query for "client". The search procedure can be carried out such a manner that it is solved whether the searched property has an alias, and if so, the search query is expanded to include also the alias. If the alias of "client" is "CU52M3R", then the search query can formulated "client=Company X or alias=CU52M3R=Company X".

It is also possible that the search query includes only the alias, and the search is performed only according to alias name. When the search is carried out with the alias, any property in the search target servers having a same alias are reached. And if such a property, despite the property name, has a value "Company X", the document comprising such property is returned as a search result. Therefore, alias based metadata driven search makes it possible to perform searches by means of metadata values between servers having a different metadata structure.

It has been described that each property in the metadata structure is copied to the target server, if such a property can be mapped to the metadata structure of the target server. However, the source server may define that even though the metadata structure comprises mappable properties, a certain property is still not published in the metadata structure of the target server or transferred at all to the target server. Each property in the metadata structure may have a mark (a flag, a numerical value, a letter) that indicates whether the property in question can be published or not. For example, for certain local servers held by subcontractors, property "customer" can be hidden or unpublished. The controlled publication may relate to the document also. This means, that a property of the document may indicate whether the document can be published in the target server or not.

In addition, each property in the metadata structure may have mark (a flag, a numerical value, a letter, a definition) that indicates the permission to transfer such property to the target server or any server to which such property can be transferred. For example, some properties for HR server (human resources) may be considered secret for employee server, and such properties are not transferred with the documents.

In the previous description, the term "property" should be read to include any feature of the document. A mappable property is either a name of a user-defined feature (i.e. a name-value pair) of an electronic object, or a property value of certain properties with predefined semantics (such as a class, a workflow, a workflow state, a permission etc.).

The mapping process can be performed by such server that is a target of synchronization. The sending server (that has the document and the associated properties to be synchronized) provides the document and the associated properties with the alias data to the target server. By the received information, the target server is able to perform the mapping. This means that the sending server filters the metadata structure to include only the common names it is willing to expose, and the receiving server converts the common names to correspond the receiving server's metadata structure.

Figure 4:
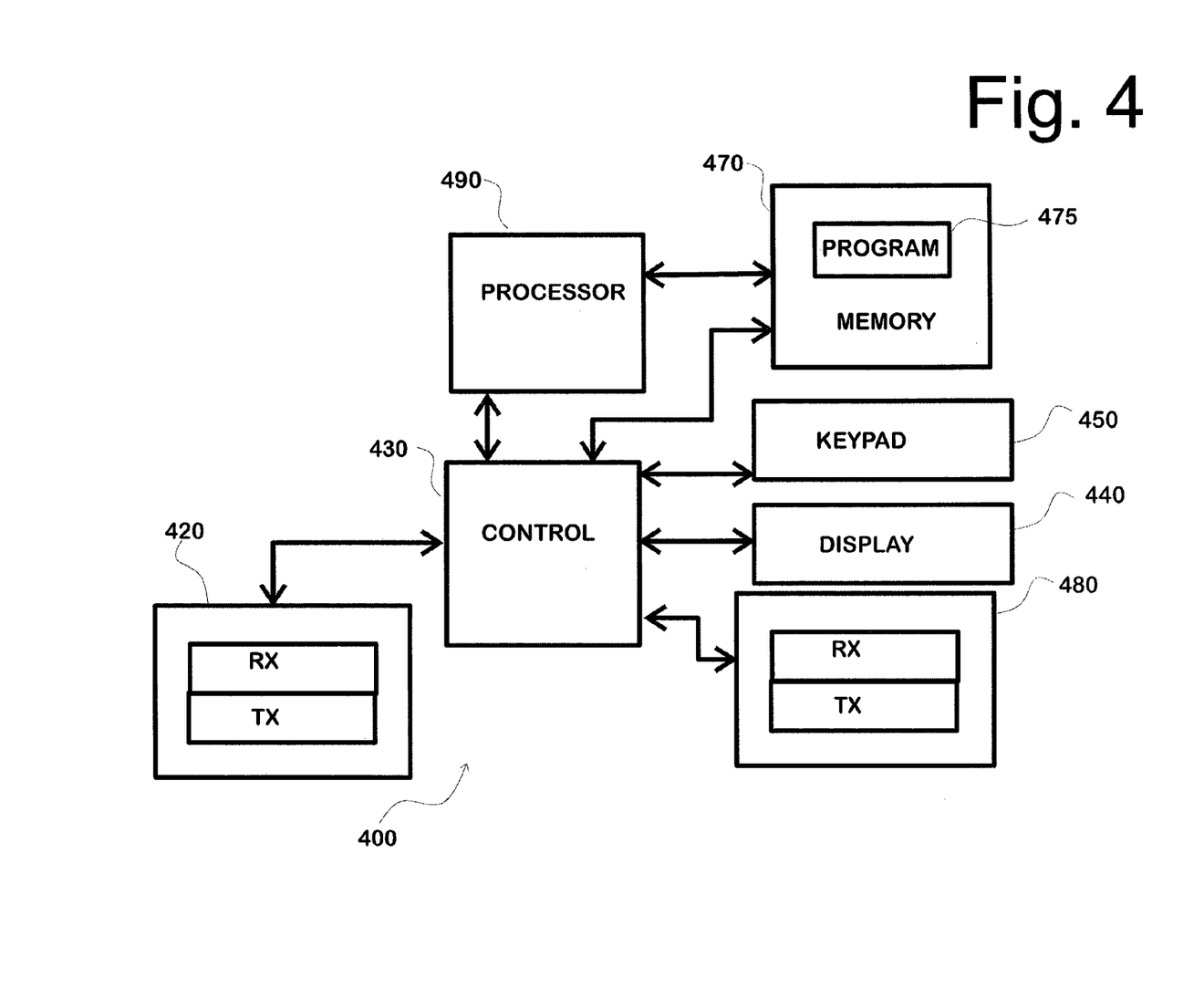
FIG. 4 shows an embodiment of a server in a simplified manner.

An example of a server is illustrated in FIG. 4. The server 400 comprises a processor 490 (Central Processing Unit, CPU) for processing data and a memory 470 that may store applications and various data etc. The server also comprises computer program code 475 residing in the memory 470. The memory 470 may be, but is not limited to, a single memory, CD, DVD, ROM, RAM, EEPROM, optical storage, or any other non-volatile storage medium capable of storing digital data.

The server 400 comprises also a control unit 430 for controlling functions in the server 400. The control unit 430 (MCU, Main Control Unit) may comprise one or more processors. The control unit 430 may run a user interface software to facilitate user control of at least some functions of the server 400. The control unit 430 may also deliver a display command and a switch command to a display 440 to display visual information, e.g. a user interface. The server may also be connected to a keypad 450 for receiving input from the user. The control unit 430 may also communicate with the processor 490 and can access the memory 470.

Yet further, the server may comprise various communication means 420, 480 having a transmitter and a receiver for connecting to the network and for sending and receiving information. The first communicating means 420 can be adapted for telecommunication and the other communicating means 480 can be a one kind of short-range communicating means, such as Bluetooth™ system, WLAN system (Wireless Local Area Network) or other system which suits for local use and for communicating with another device.

Figure 5:
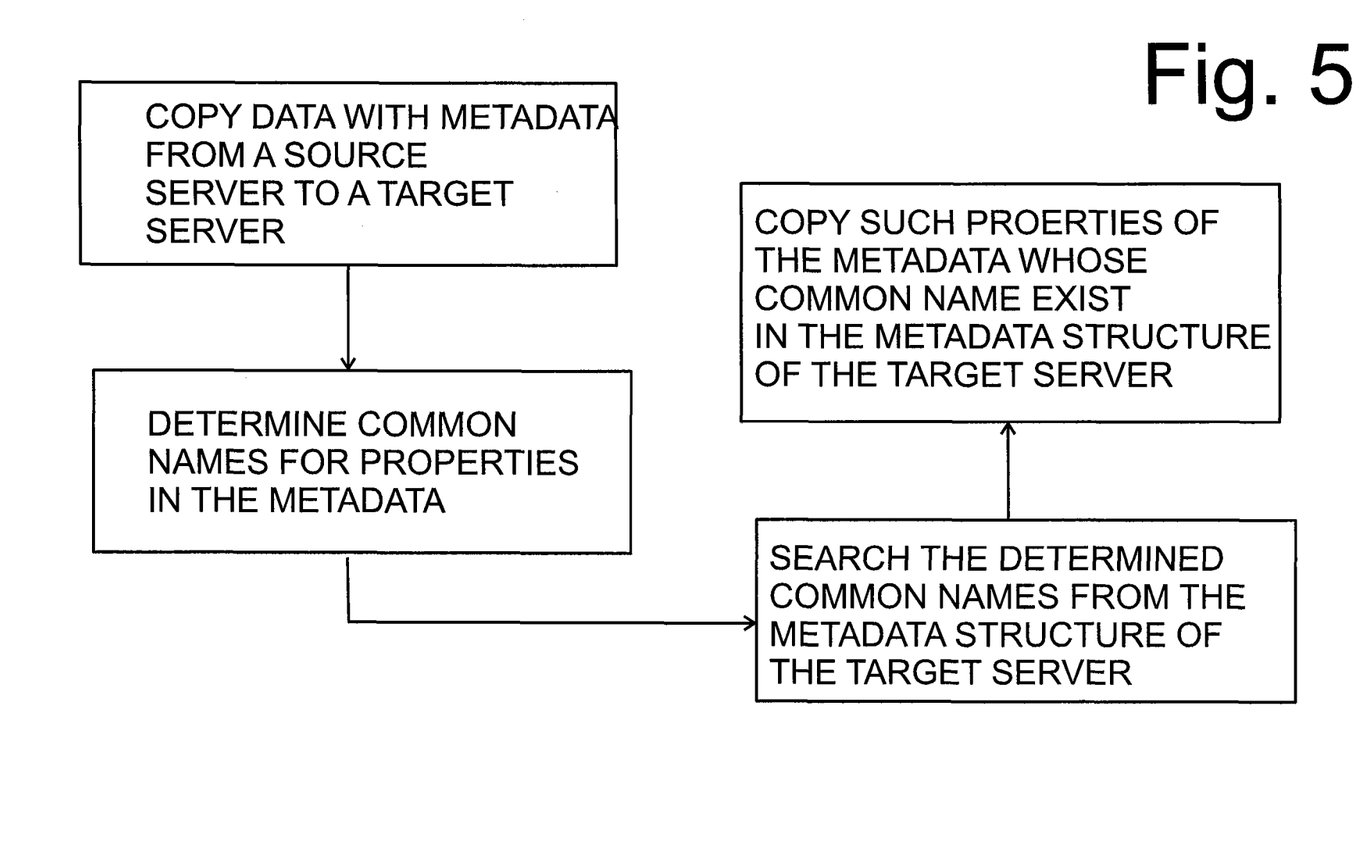
FIG. 5 shows an embodiment of the method as a simplified flowchart.

FIG. 5 illustrates an embodiment of the method as a simplified flowchart.

The various embodiments of the invention can be implemented with the help of computer program code that resides in a memory and causes the relevant apparatuses to carry out the invention. For example, a client device may comprise circuitry and electronics for handling, receiving and transmitting data, computer program code in a memory, and a processor that, when running the computer program code, causes the client device to carry out the features of an embodiment. Yet further, a network device may comprise circuitry and electronics for handling, receiving and transmitting data, computer program code in a memory, and a processor that, when running the computer program code, causes the network device to carry out the features of an embodiment.

The present embodiments represent a great achievement in the field. In an embodiment, the content management system is a hybrid system comprising a main server residing in the cloud service and a local main server (optionally with a caching replica server) being an on-premise server. Such a hybrid system comprises substantially equally strong servers (main server and local main server), which together can provide their own benefits to the user. For example, because of the local main server the data usage becomes fast, and because of the cloud server, the data is always (temporally and geographically) available, The use of caching replica server, on the other hand, reduces the copying need for all the data, because in addition to providing a direct connection to the main server, it caches the frequently used data closer to the user.

A synchronized local main server having the relevant data copied close to the user, on the other hand, improves the availability of the system and data, for example, if the network connections are not optimal for continuous online connectivity, thus contributing to an offline mode between servers.

It is obvious that the present invention is not limited solely to the above-presented embodiments, but it can be modified within the scope of the appended claims.

The invention claimed is:

1. A method for synchronizing metadata between servers when metadata structure of these servers deviate, wherein synchronizing comprises copying data from a source server to a target server, wherein said data is associated with a metadata having a set of properties, a property comprising a property name and a property value, the method comprising:
   mapping the metadata from the source server to a metadata structure of the target server, where the mapping comprises
   determining aliases for property names being comprised in the metadata, wherein an alias defines a general concept for a property in question;
   determining if the metadata structure of the target server comprises property names having the same aliases; and if so,
   copying data with such properties of the associated metadata from the source server that have matching aliases in the metadata structure of the target server.

2. A server comprising a processor, memory including computer program code, the memory and the computer program code configured to, with the processor, cause the server to perform at least the following:
   synchronizing metadata between servers when metadata structure of these servers deviate, wherein synchronizing comprises copying data from the source server to a target server, wherein said data is associated with a metadata having a set of properties, a property comprising a property name and a property value;
   mapping the metadata from the source server to a metadata structure of the target server, where the server is configured to perform
   determining aliases for property names being comprised in the metadata, wherein an alias defines a general concept for a property in question;
   determining if the metadata structure of the target server comprises property names having the same aliases; and if so,
   copying data with such properties of the associated metadata from the source server that have matching aliases in the metadata structure of the target server.

3. A computer program product comprising a computer-readable medium bearing computer program code embodied therein for use with a computer, the computer program code comprising:
   code for synchronizing metadata between a source server and a target server, when metadata structure of these servers deviate,
   code for mapping metadata being associated to data from the source server to the metadata structure of the target server, the metadata having a set of properties, a property comprising a property name and a property value;
   code for determining aliases for property names being comprised in the metadata, wherein an alias defines a general concept for a property in question;
   code for determining if the metadata structure of the target server comprises property names having the same aliases; and if so,
   code for copying data with such properties of the associated metadata from the source server that have matching aliases in the metadata structure of the target server.

4. A system comprising at least a source server comprising a processor, memory including computer program code, and a target server comprising a processor, memory including computer program code, wherein the cooperation of the source server and the target server causes the system to perform at least the following:
    synchronizing metadata between the source server and the target server, when metadata structure of these servers deviate, wherein synchronizing comprises copying data from the source server to a target server, wherein said data is associated with a metadata having a set of properties, a property comprising a property name and a property value;
    mapping the metadata from the source server to a metadata structure of the target server, wherein the system is configured to perform:
    determining aliases for property names being comprised in the metadata, wherein an alias defines a general concept for a property in question;
    determining if the metadata structure of the target server comprises property names having the same aliases; and if so,
    copying data with such properties of the associated metadata from the source server that have matching alias in the metadata structure of the target server.

5. A method according to claim 1, further comprising:
    obtaining a metadata structure template relating to the metadata structure of the target server and mapping the metadata to such a template.

6. A method according to claim 1, further comprising:
    determining whether the metadata structure of the target server comprises the same property names in the metadata.

7. A method according to claim 1, further comprising:
    controlling the copying of the metadata by determining which of the transferrable properties are allowed to be copied.

8. A method according to claim 1, wherein the alias is a string of letters or numbers.

9. A method according to claim 1, further comprising:
    querying the copied data from the source server and the target server by means of the aliases.

10. A method according to claim 1, wherein one of the servers is a cloud-based server.

11. A method according to claim 1, wherein the property is a feature of an electronic object that is expressed as a name-value pair.

12. A method according to claim 1, wherein one of the servers is an on-premise server, wherein the other of the servers is a cloud server.

13. A server according to claim 2, further comprising computer program code configured to, with the processor, cause the server to perform at least the following:
    obtaining a metadata structure template relating to the metadata structure of the target server and mapping the metadata to such a template.

14. A server according to claim 2, further comprising computer program code configured to, with the processor, cause the server to perform at least the following:
    determining whether the metadata structure of the target server comprises the same property names in the metadata.

15. A server according to claim 2, further comprising computer program code configured to, with the processor, cause the server to perform at least the following:
    controlling the copying of the metadata by determining which of the transferrable properties are allowed to be copied.

16. A server according to claim 2, wherein the alias is a string of letters or numbers.

17. A server according to claim 2, further comprising computer program code configured to, with the processor, cause the server to perform at least the following:
    querying the copied data from the source server and the target server by means of the aliases.

18. A server according to claim 2, wherein one of the servers is an on-premise server, wherein the other of the servers is a cloud server.

19. A server according to claim 2, wherein the property is a feature of an electronic object that is expressed as a name-value pair.

20. A system according to claim 4, wherein one of the servers is an on-premise server, wherein the other of the servers is a cloud server.

21. A method according to claim 6, further comprising:
    mapping the properties of the metadata according to the same property names in the metadata structure of the target server.

22. A method according to claim 11, wherein the mapping of the properties is performed for each property name, and additionally for each property value of certain properties with predefined semantics.

23. A server according to claim 14, further comprising computer program code configured to, with the processor, cause the server to perform at least the following:
    mapping the properties of the metadata according to the same property names in the metadata structure of the target server.

24. A server according to claim 19, wherein the mapping of the properties is performed for each property name, and additionally for each property value of certain properties with predefined semantics.

25. A method according to claim 22, wherein the predefined semantics are selected from the group consisting of object class, workflow, a workflow rate and a permission.

26. A server according to claim 24, wherein the predefined semantics are selected from the group consisting of object class, workflow, a workflow rate and a permission.

* * * * *